Patented May 5, 1953

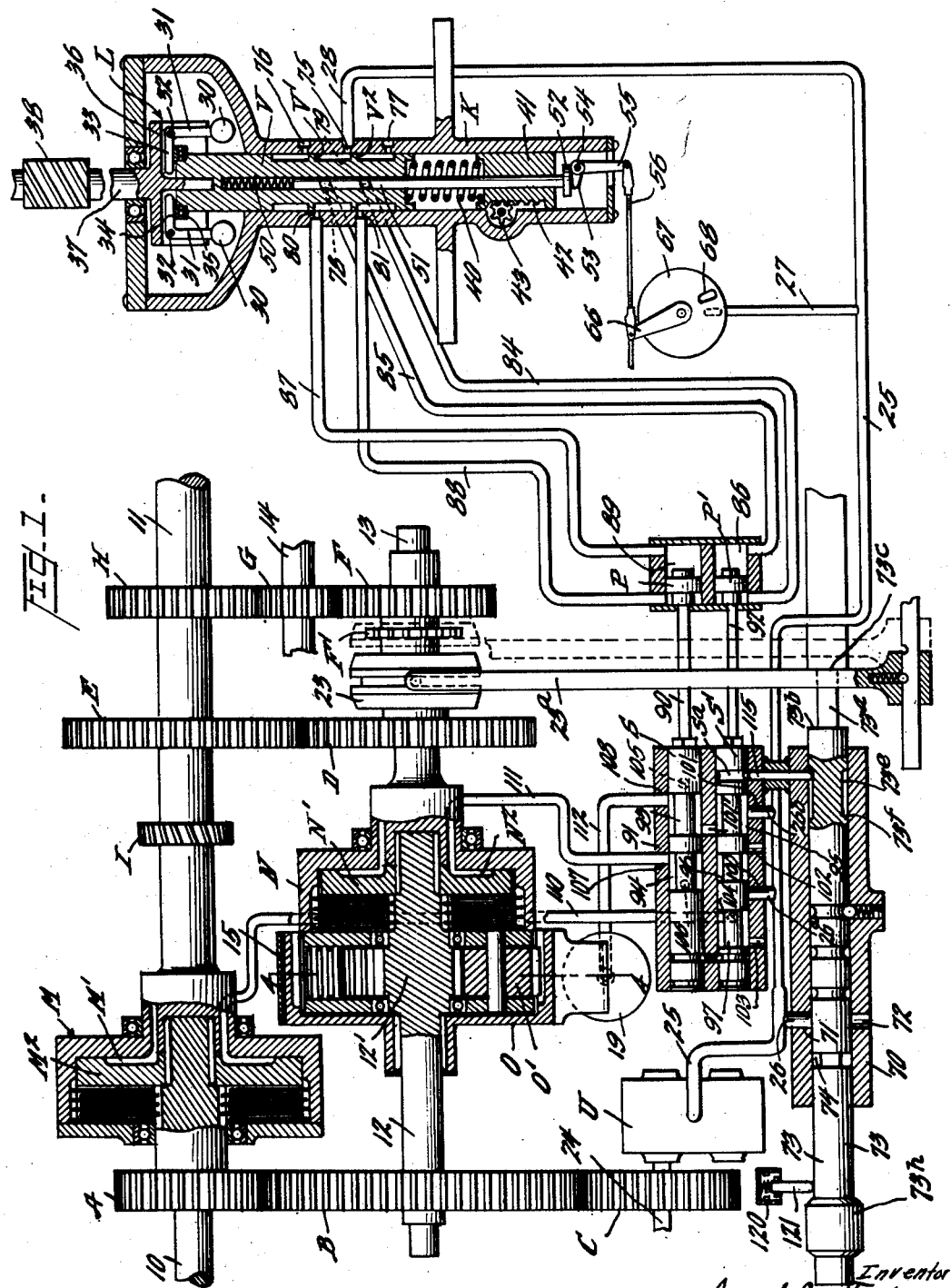

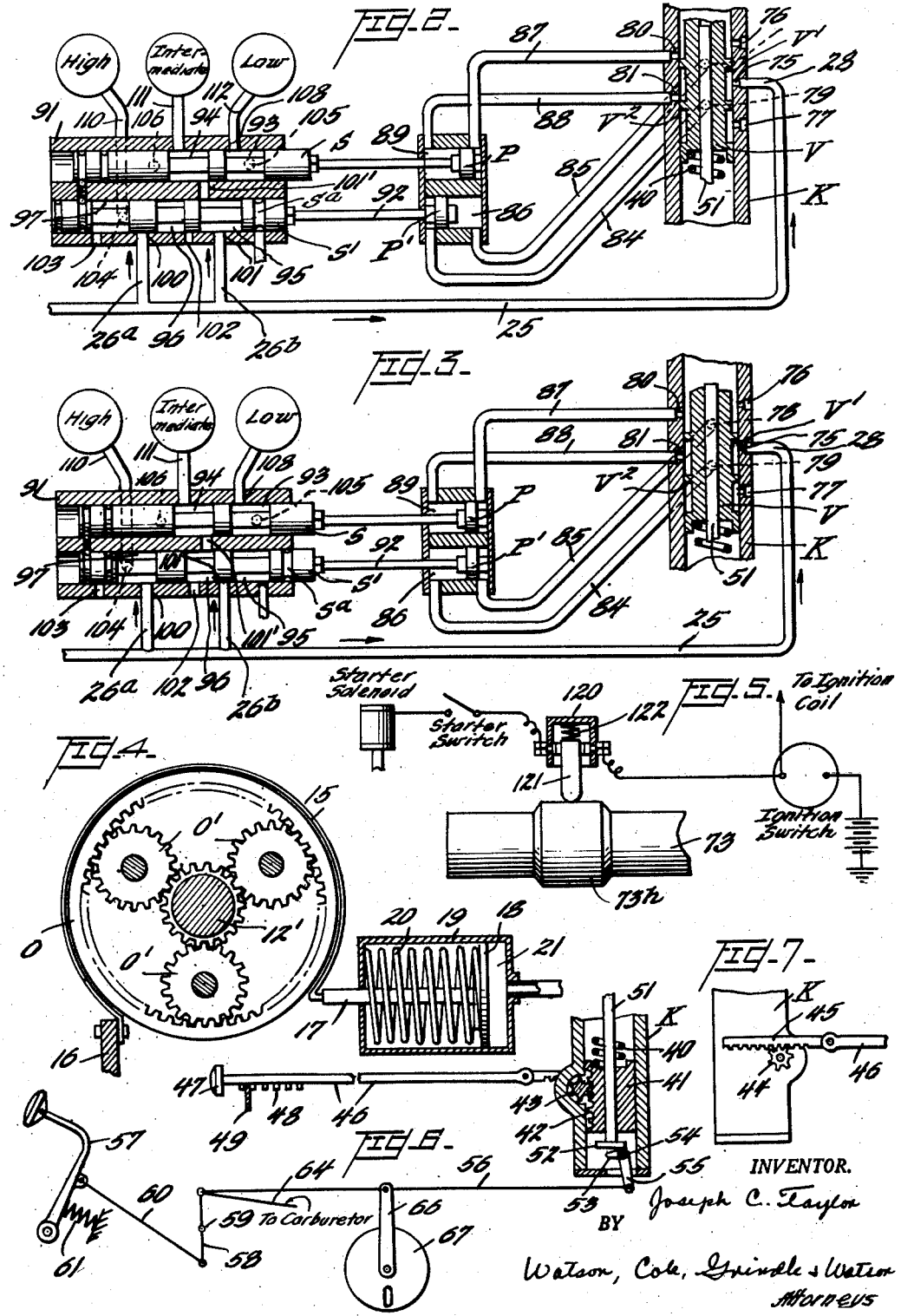

2,637,217

UNITED STATES PATENT OFFICE 2,637,217

AUTOMATIC TRANSMISSION

Joseph C. Taylor, St. Louis, Mo., assignor, by mesne assignments, to Packard Motor Car Company, Detroit, Mich., a corporation of Michigan Application August 8, 1947, Serial No. 767,505

3 Claims. (Cl. 74—472)

This invention relates to automatic gear changing mechanisms and particularly to mechanisms of this general class which are primarily designed and intended for use in connection with automotive vehicles.

Automatic gear changing mechanisms in which gear ratios are changed from time to time by the automatic operation of devices which are brought into operation by changes in the speed of the vehicle are well known and have heretofore been successfully used. A mechanism of this nature generally includes a governor or speed responsive device operatively connected to a rotatable part the angular velocity of which varies directly as the speed of the vehicle, together with mechanically or hydraulically actuated devices for effecting the actual gear changing operations, such devices being under the control of the governor.

The present invention contemplates the utilization of a gear changing mechanism in which the actual gear changing operations are effected by power supplied by fluid under pressure, the flow of fluid under pressure being controlled not only by the speed responsive device or governor but likewise by manually operable instrumentalities in the nature of valves, including a valve associated with a throttle operating mechanism and a valve associated with a manually operable gear shift rod, the arrangement being such that the mechanism must of necessity remain inoperative until the operator of the vehicle performs two preliminary operations, i. e. until the operator actuates a gear shift lever which is normally in neutral position but which must be moved from that position in one direction if the vehicle is to be driven forwardly by its power plant or moved in the reverse direction if the vehicle is to move rearwardly, and also operates a throttle control mechanism to effect increase of fuel supply to the engine. The mechanism as an entirety being thus inoperative until and unless the operator makes two deliberate preliminary moves, adequate safeguards against accidental actuation are provided. After the engine has been started, and after the gear shift lever has been actuated and the throttle control mechanism also actuated, the vehicle will start in low gear and the shifting to intermediate and higher gear ratios will be automatically effected as the speed of the car increases, likewise the shifting from a higher to a lower gear being automatically effected as the speed of the car decreases.

The mechanism also includes a switch in the electrical connection between the battery and the starter switch of the car, this added switch being positioned adjacent a member which is operated by the gear shift lever and being so operatively associated therewith that the switch remains open, and the starting mechanism inoperative, unless and until the gear shift rod is in neutral position. Thus it is impossible for an operator to inadvertently or accidentally start the engine while the vehicle is in gear, as sometimes occurs with gear changing mechanisms of other types. While the gear changing operations are automatically effected while the vehicle is under way, the mechanism is to a certain extent still under control of the operator of the vehicle in that, whenever great power is needed suddenly while the vehicle is in progress the controlling action of the governor may be overcome by the operator who will simply operate the throttle control mechanism to effect the widest possible opening of the throttle, the throttle control mechanism being so connected to the governor as to modify its action temporarily and cause the gear changing mechanism to automatically reduce the gear ratio while the emergency exists.

The mechanism includes a number of novel features of construction, to be hereinafter described at length and which are shown on the accompanying drawings in which:

Figure 1 is a diagrammatic showing of the mechanism as an entirety, no attempt having been made to show the several operating parts in the relationship which they bear to each other when assembled in a vehicle, and certain of the parts being shown out of proportion to others in order that the operative relationship of each part to the other parts may most clearly be brought out;

Figures 2 and 3 are diagrams showing certain of the fluid pressure controlling valves in positions which are different from those which they are shown to occupy in Figure 1, corresponding to different gear ratios;

Figure 4 is a section on line 4—4 of Figure 1;

Figure 5 is a diagram of the starter circuit showing the switch which normally opens the circuit unless and until the gear shift rod is moved to neutral position;

Figure 6 is a diagram showing connections between the fuel control lever and other elements of the mechanism, including the speed responsive device or governor; and Figure 7 illustrates a detail in side elevation.

The gearing shown in Figure 1 will be recognized as being largely conventional, the transmission shaft being indicated at 10, propeller shaft at 11, these shafts being in alignment and adapted to be operatively connected and disconnected by means of a clutch generally indicated at M, the clutch M being of the fluid pressure responsive type and being operative when fluid pressure is maintained in the chamber $M^1$ against the face of piston $M^2$, and being inoperative when the pressure of the fluid is relieved. Gear A on transmission shaft 10 is in constant mesh with gear B on a parallel shaft 12. Aligned with shaft 12 is a short shaft 13 and means is provided for directly connecting shafts 12 and 13, so that they rotate at the same speed, or for connecting them through a planetary system so that shaft 13 will rotate at less speed than shaft 12.

This means includes the clutch N with its piston $N^1$ adapted to be moved on its clutch engaging stroke when fluid under pressure is introduced into the chamber $N^2$, and to be disengaged when this fluid pressure is relieved, together with the planetary system including the drum O rotatably mounted on shaft 12 and the cylindrical interior surface of which is toothed so that it comprises an internal gear, and the three planetary gears $O^1$, the teeth of which mesh with the internal teeth of the drum O and the external teeth formed upon the hub portion $12^1$ of shaft 12. Other details of the planetary gearing are conventional and need not be described. Drum O is partially encircled by a brake band 15, most clearly seen in Figure 4, one end of which is anchored to a stationary part 16 and the other end of which is connected by means of a rod 17 to a piston 18 movable in cylinder 19. A spring 20 located within the cylinder normally maintains the piston 18 in some such position as it is shown in Figure 4 and the band 15 out of gripping engagement with the surface of the drum O. Introduction of fluid under pressure into the pressure chamber 21 of the cylinder will, however, effect engagement of band 15 with the cylindrical surface of the drum O and will prevent the drum from rotating.

Mounted for free rotation on shaft 13 are gears D and F respectively, the teeth of gear D being in constant mesh with the teeth of gear E of shaft 11 and the teeth of gear F being in constant mesh with the teeth of a reverse idler gear G which in turn mesh with those of a gear H fixed on shaft 11. For clutching either gear D or gear F to shaft 13 a shiftable synchronizer 23 of generally conventional character is employed, this synchronizer being splined on shaft 13 and movable longitudinally thereon and provided with two series of internal teeth (not illustrated) one such series being adapted to be brought into meshing engagement with gear $F^1$ rigidly mounted upon a sleeve integral with gear F, the synchronizer being shown in this position in dotted lines in Figure 1, and the second internal gear of the synchronizer 23 being adapted to be brought into meshing engagement with a similar gear rigid with gear D, the synchronizer being shown in full lines in Figure 1 to be operatively connecting gear D to shaft 13 and gear F being free to rotate on shaft 13. By the application of fluid under pressure to the chambers $M^1$, $N^2$ and 21 of the several fluid pressure responsive instrumentalities described gear ratio change is effected. The mechanism for supplying such fluid under pressure to one or the other of these instrumentalities, and simultaneously venting the other two, will now be described.

A constant source of fluid under pressure is needed and this may conveniently be a gear pump, such a pump being diagrammatically indicated at U in Figure 1, one rotor of the pump being mounted upon the shaft 24 and the teeth of gear C, which is also fixed on shaft 24, meshing with those of gear B previously described so that the pump is in operation whenever the transmission shaft 10 is revolving. The output of the pump is directed into a distributing main 25 which has four branches and a terminal end, indicated by the numerals 26, 26a, 26b, 27 and 28, respectively. The outflow of oil through each of the branches 26 and 27 is controlled by a manually operable valve hereinafter to be described, and the fluid discharged from the terminal end 28 of the main 25 is likewise valve controlled but may not be interrupted, the purpose of the valve being to distribute the outflowing oil rather than to interrupt the flow.

This distributing valve is indicated at V in Figure 1 and is in the nature of a valve of generally cylindrical nature having circumferential ribs $V^1$ and $V^2$ the cylindrical outer surfaces of which make close sliding engagement with the cylindrical inner surface of the valve casing K, the valve body V as an entirety being freely slidable axially of its casing. Valve V is under control of a governor or speed responsive device which is generally indicated at L and may be of any suitable type but preferably is of the centrifugal type including weight members 30 mounted on the ends of arms 31 of bell crank levers pivoted at 32, each such lever having a second arm 33 engaging the outer race 34 of a ball or roll bearing the inner race 35 of which is mounted upon the end of the valve body V. By means of the pivots 32 the several weighted levers are connected to, and move bodily with, a hub 36 supported upon the end of a shaft 37. Rigidly mounted upon shaft 37 is a spiral gear 38 and the teeth of gear 38 mesh with those of gear I which is fixed upon the propeller shaft 11. The upper end of the casing K of the valve is enlarged to comprise a suitable housing for the speed responsive mechanism thus described.

A helical spring 40 opposes the action of the speed responsive device, one end of this spring bearing against the end of the valve V which is remote from the speed responsive device, and the other end being supported by a shiftable abutment member 41. Abutment member 41 is toothed on one side to provide a rack 42 and meshing with the teeth of this rack are those of a pinion 43 rotatably mounted in a recess formed in the wall of the casing K. By rotating pinion 43 the position of the shiftable abutment 41 may be altered and the tension in the spring 40 modified, hence the degree of opposition of the spring to the movements of the valve V under the action of the speed responsive device changed from time to time as may be desired. The shaft upon which pinion 43 is mounted extends outwardly through the wall of casing K and upon its outer end is fixed a second pinion 44 (Figure 7) the teeth of which mesh with those of a rack 45 the movements of which may be controlled in any suitable manner from the operator's position, for instance by means of a link 46 having an operating handle 47 within convenient reach of the operator and a series of teeth 48, the link 46 being longitudinally shifted to bring any selected interdental space into registry with the edge of a stationary member 49 so that, when member 49 is positioned intermediate two teeth, the link is held against longitudinal movement and hence the shiftable abutment 41 held against movement longitudinally within the casing K.

Valve V has formed therein an axial bore within which is housed a helical spring 50 and a rod 51 the inner end of which bears against one end of spring 50. Rod 51 also passes through an aligned bore in the shiftable abutment 41 and has fixed upon its outer end a disc 52 adapted to be acted upon by the shorter arm 53 of a bell crank lever pivotally supported at 54 to the wall of casing K. The longer arm 55 of the bell crank lever projects beyond the end of the casing and is connected by means of a link 56 to one end of a lever 58 fulcrumed at 59, the opposite end of lever 58 being connected by a link 60 to the pedal 57 which is normally urged into the position in which it is shown in Figure 6 by a spring 61. The upper end of lever 58 is also connected to the carburetor of the vehicle by means of a link 64. Depression of pedal 57 thus increases the supply of fuel to the engine of the vehicle and likewise rocks the bell crank lever 55 which in turn longitudinally advances rod 51 against the action of spring 50. Also connected to link 56, intermediate its ends, is one end of a lever 66 which extends laterally of and is rigidly connected to a rotatable valve 67 provided with a port 68 which may be brought into register with the terminal end of the branched duct 27 of the fluid supply main 25. Depression of pedal 57 will therefore also effect movement of valve 67 and the arrangement is such that the valve closes the port at the end of the branch duct 27 when pedal 57 is actuated, thus preventing escape of liquid from main 25 through this duct.

Branch duct 26 previously referred to leads to a cylindrical casing 70 having aligned ports 71 and 72 in its wall. Slidably fitting within the cylindrical casing 70 is a rod 73 which may be designated a gear shift rod inasmuch as it is operatively connected to a gear shift lever (not illustrated) which lever is adapted to be manually manipulated by the operator of the vehicle. Rod 73 is cut away at 74 to provide an annular recess or chamber which may be brought into register with ports 71 and 72, thus permitting fluid to flow from main 25 through the outer escape or by-pass aperture 72, or the rod may be moved longitudinally by means of the gear shift lever into position (as shown in Figure 1) to interrupt this flow. It is thus clear that the fluid under pressure which is delivered by the pump into the main 25 may escape through by-pass port 72 which is controlled by a valve which may be actuated by the gear shift lever, or may escape through the port 68 in valve 67, or may pass from the terminal end 28 of main 25 into the casing K through port 75 in casing K. It is only when ports 72 and 68 are both closed by their associated valves that the fluid supplied will be under sufficient pressure to cause automatic operation of the gear ratio changing mechanism. Such fluid under pressure, for the purpose of operating the gear changing mechanism, will flow through branch ducts 26a and 26b, the flow being controlled by valve mechanism to be hereinafter more fully described.

It will be observed from Figure 1 that, in addition to port 75, casing K is provided with six additional ports indicated, respectively, at 76, 77, 78, 79, 80 and 81, ports 76 and 77 being fluid discharge ports through which fluid may escape from the interior of casing K into a suitable receptacle, it being understood that this fluid, which is preferably oil, is collected for re-use together with the fluid which may escape through port 68 of valve 67, the fluid which may escape through port 72 of valve casing 70, and the fluid escaping through other ports hereinafter to be described, all such fluid being preferably collected in a sump into which extends the intake pipe of the gear pump U.

Ports 78 and 79 communicate through conduits 84 and 85 with the opposite ends of a cylinder which is generally indicated at 86 and ports 80 and 81 communicate through ducts or conduits 87 and 88 with the opposite ends of a cylinder generally indicated at 89.

A piston P slidable within cylinder 89 may be caused to reciprocate by applying pressure upon one face and permitting the fluid in the opposite end of the cylinder to escape, and likewise piston $P^1$ may thus be moved from end to end of the cylinder 86. Piston P is connected by means of a piston rod 90 to a cylindrical slide valve S closely fitting within a cylindrical chamber formed within the valve casing 91 and piston $P^1$ is connected by piston rod 92 with a cylindrical slide valve $S^1$ reciprocable within a cylindrical chamber which is preferably formed in the same valve casing 91. Slide valve S is cut away at 93 and 94 to provide annular passageways for fluid around the valve and slide valve $S^1$ is cut away at 95, 96 and 97, to provide three passages by means of which fluid may pass around that valve. Formed in the walls of the cylindrical chambers which receive the slide valves S and $S^1$ are a series of ports indicated respectively at 100, 101, 102, 103, 104, 105, 106, 107 and 108. Of these ports, those indicated at 100 and 101 are in continuous communication with the fluid pressure main 25 through branch ducts 26a and 26b and constitute fluid supply ports, and ports 102, 103, 105 and 106 respectively comprise ports which may be designated fluid escape ports, fluid passing outwardly through these ports being collected in the sump previously mentioned for the collection of such fluid. Fluid outlet port 104 is in constant communication with chamber $M^1$ of clutch M, the connecting duct being indicated at 110. Fluid outlet port 107 is in constant communication with chamber $N^2$ of clutch N the connecting duct being indicated at 111, and fluid outlet port 108 is in constant communication with space 21 of cylinder 19 previously described, the connecting duct being indicated at 112.

In the automatic operation of the mechanism the governor control valve V, when the vehicle is underway, will be longitudinally moved under the influence of the governor and against the action of spring 40, as previously stated. The position of valve V determines the direction of flow of fluid to and from cylinders 86 and 89, thus effecting reciprocatory movements of pistons P and $P^1$ and of valves S and $S^1$. Valves S and $S^1$ directly control the passage of fluid under pump pressure to the several fluid pressure responsive devices described, i. e. the clutches M and N and the cylinder 19. When the valves V, S and $S^1$ are in the positions in which they are illustrated in Figure 1 and the rod 73 and valve 67 are positioned as shown in that figure, the output of the pump passes through port 101, port 101¹, port 108, duct 112, and into cylinder 19, the band 15 will grip the drum O to halt the rotation thereof and the drive will be from the transmission shaft 10 through gears A and B, shaft 12, the planetary assembly, shaft 13, synchronizer 23, and gears D and E to the propeller shaft 11, the drive being thus at low gear.

In Figure 2 of the drawings are illustrated valve V, pistons P and P¹ and slide valves S and S¹ in the positions which these parts occupy when arranged for intermediate speed ratio drive. It will be observed that, by reason of the action of the governor the valve V has been moved so that the port 80 has been brought into communication with the discharge port 76, thus permitting fluid to escape from the right hand end of cylinder 89. Ports 78 and 79 are blocked and port 75 is in communication with port 81 so that piston P has been moved to the right hand end of cylinder 89, pulling after it the slide valve S. Port 108 has thus been brought into communication with the by-pass port 105 and the pressure in cylinder 19 is relieved, causing band 15 to release drum O. At the same time communication has been established between port 101 and the fluid chamber N² of clutch N so that that clutch is engaged, planetary movement ceases, and the drive is from the transmission shaft 10 through gears A and B, shafts 12 and 13, gears D and E to the propeller shaft 11. Further movement of the valve V in the same direction brings about the condition indicated by the diagram of Figure 3 in which the piston P¹ has also been moved to the right, bringing with it slide valve S¹, the port 100 being thus brought into communictaion with the chamber M¹ of clutch M and the drive being thus direct from transmission shaft 10 through clutch M to the propeller shaft 11. When the valve S¹ is moved to the position shown in Figure 3, the chamber N² of clutch N is brought into communication with the by-pass port 102 and the pressure in that chamber relieved, thus disconnecting shafts 12 and 13. Reversal of movement of slide valve V, as the speed of the vehicle decreases, will cause the gear ratio to be changed in reverse sequence. Automatic change in gear ratio will thus be effected from time to time as the vehicle proceeds, so long as some pressure is applied to the throttle operating pedal and the discharge port in the end of branch duct 27 is closed and the gear shift rod 73 closes port 72.

If, during forward movement of the vehicle, it is desired to develop the greatest possible amount of power, as when there is an emergency, the operator will depress the accelerator pedal to the maximum extent. As a result the bell crank lever 55 is rocked, spring 50 will be compressed, and valve V will be moved under the influence of the spring, causing change in the distribution of fluid under pressure and a shift to a lower gear ratio. When the speed of the vehicle increases sufficiently, the action of the governor will automatically restore the drive to high gear.

Greatest economy in the use of fuel may be obtained if the normal tension in spring 40 be kept as low as possible. If this be done the governor will be able to force slide valve V rather easily to the high speed position of Figure 3 and thus facilitate shifting to high gear at low vehicle speeds. By adjusting the abutment 41 to increase the normal tension in the spring the shifting to high gear may be caused to occur at higher vehicle speeds. By manipulating the handle 47 therefore the operator may vary substantially the vehicle speeds at which gear shifts occur.

If gear shift rod 73 is moved to the rear (to the right in Figure 1) from its neutral position, port 72 will of course be blocked as before and, upon depression of the throttle lever, valve 67 will close the outlet of duct 27 thus causing fluid pressure to build up in main 25. Rearward shifting of rod 73 likewise causes the synchronizer 23 to separate from gear D and operatively engage gear F¹ which is rigid with gear F, so that the drive will be through the gear train F, G, H. Movement of the synchronizer is effected by movement of the shifter fork 23a, this fork having an aperture through which the reduced portion 73a of rod 73 freely passes. Shoulders 73b and 73c of rod 73 alternately contact with the shifter fork 23a and effect movements of this fork as the rod is moved.

It is not desirable to have automatic adjustment to high gear when the vehicle is in reverse and for that reason means is provided to prevent movement of slide valve S¹ when gear shift rod 73 is shifted rearwardly. To thus lock valve S¹ against movement a locking rod 115 is provided. One end of this rod is received within an annular groove 73e formed in rod 73, one end of this groove, indicated at 73f being inclined, preferably conical, and comprising a cam adapted to act upon the end of locking rod 115, when rod 73 reaches the end of its rearward movement, and to thrust this rod 115 toward valve S¹, which will then be in low gear drive position, and cause its end to enter the annular groove Sa formed in that valve. So long as the rod 73 is maintained in its rearward position of adjustment valve S¹ will be held against movement and hence it will not be possible for the vehicle to be driven at high speed in a rearward direction. When the rod 73 is moved to neutral or forward position rod 115 will unlock valve S¹ which may then be reciprocated by fluid under pressure in the manner heretofore explained.

Gear shift rod 73 is also employed to operate a switch in the starter circuit of the vehicle, the arrangement being such that this switch is closed, and it is thus possible to start the engine, only when the gear shift rod is in neutral position. Such a switch in the starter circuit is diagrammatically illustrated in Figures 1 and 5, being indicated at 120. The movable blade or contact member of the switch is associated with a member 121 which is supported for movement along a fixed path and one end of which bears against rod 73, such contact being maintained at all times by a spring 122 which acts upon it. When rod 73 is in neutral position the enlarged portion 73h thereof, which in effect comprises a cam having inclined portions at its ends, directly engages member 121 and the switch is closed. The engine of the vehicle may then be started as the circuit through the starter solenoid may be closed in the usual manner. If the rod 73 has previously been moved either to its forward or its rear position, however, the switch 120 will be open and the engine may not be started. The advantages of this arrangement will be apparent.

Having thus described the invention, what is claimed as new and desired to be secured by Letters Patent is:

1. An automatic gear changing transmission for automotive vehicles including in combination, a source of fluid under pressure, a conduit into which fluid under pressure is discharged, said conduit having three spaced fluid discharge ports for the simultaneous discharge of three streams of fluid in parallel, a valve associated with each discharge port for controlling escape of fluid therefrom, a gear shift rod associated with one of said valves, the valve being disposed to close the associated port when the rod is moved from neutral position, a throttle control operatively connected to a second valve, a governor operatively connected to the third valve, and a propeller shaft to which said governor is operatively connected and by which it may be driven, the arrrangement being such that insufficient fluid under pressure is delivered through said conduit to the port controlled by said third valve unless said two first mentioned valves are closed.

2. An automatic change gear transmission for automotive vehicles comprising in combination, a governor operatively connected to a propeller shaft and directly responsive to changes in speed of that shaft, a throttle operating means, a source of fluid under pressure, a plurality of fluid pressure responsive devices adapted to be actuated by fluid delivered from said source, a clutch associated with each such device, a conduit system for receiving fluid from said source and transmitting it to said devices through three parallel conduits and means for controlling the flow of fluid through said conduit system to said devices, said means including a first valve arranged to be operated by said governor, a second valve operatively associated with said throttle operating means, a third valve, each of said valves being associated with one, and only one, of said conduits, and a gear shift rod, said third valve being operatively associated with said gear shift rod, and being in port closing position only when said gear shift rod has been moved from its neutral position.

3. In an automatic change gear transmission, in combination, a source of fluid under pressure, a plurality of fluid pressure responsive clutches, conduits leading from said source to said clutches respectively, a plurality of independently operable valves for controlling fluid flow through said conduits respectively, a piston for actuating each of such valves, cylinders in which said pistons move, conduits for connecting the ends of said cylinders, respectively, to the source of fluid under pressure, a valve device controlling the flow of fluid to said cylinders, and a governor operatively connected to said valve device.

JOSEPH C. TAYLOR.

References Cited in the file of this patent

UNITED STATES PATENTS

| Number | Name | Date |
|---|---|---|
| 1,609,782 | Small | Dec. 7, 1926 |
| 1,695,951 | Cunningham | Dec. 18, 1928 |
| 1,791,502 | Hoy | Feb. 10, 1931 |
| 2,084,153 | Linsley | June 15, 1937 |
| 2,104,061 | Surdy | Jan. 4, 1938 |
| 2,137,961 | Vorech | Nov. 22, 1938 |
| 2,228,082 | Krome | Jan. 7, 1941 |
| 2,241,677 | Sheldrick | May 13, 1941 |
| 2,242,276 | Vincent | May 20, 1941 |
| 2,260,406 | Roche | Oct. 28, 1941 |
| 2,319,388 | Cotterman | May 18, 1943 |
| 2,329,724 | Maurer | Sept. 21, 1943 |
| 2,352,212 | Lang et al. | June 27, 1944 |
| 2,376,545 | Livermore | May 22, 1945 |
| 2,422,596 | Stevens | June 17, 1947 |
| 2,430,799 | Aspinwall | Nov. 11, 1947 |
| 2,438,455 | Roeder | Mar. 23, 1948 |
| 2,516,203 | Greenlee et al. | July 25, 1950 |